No. 638,383. Patented Dec. 5, 1899.
J. P. DUVALL.
ATTACHMENT FOR HARROWS.
(Application filed June 6, 1899.)
(No Model.)
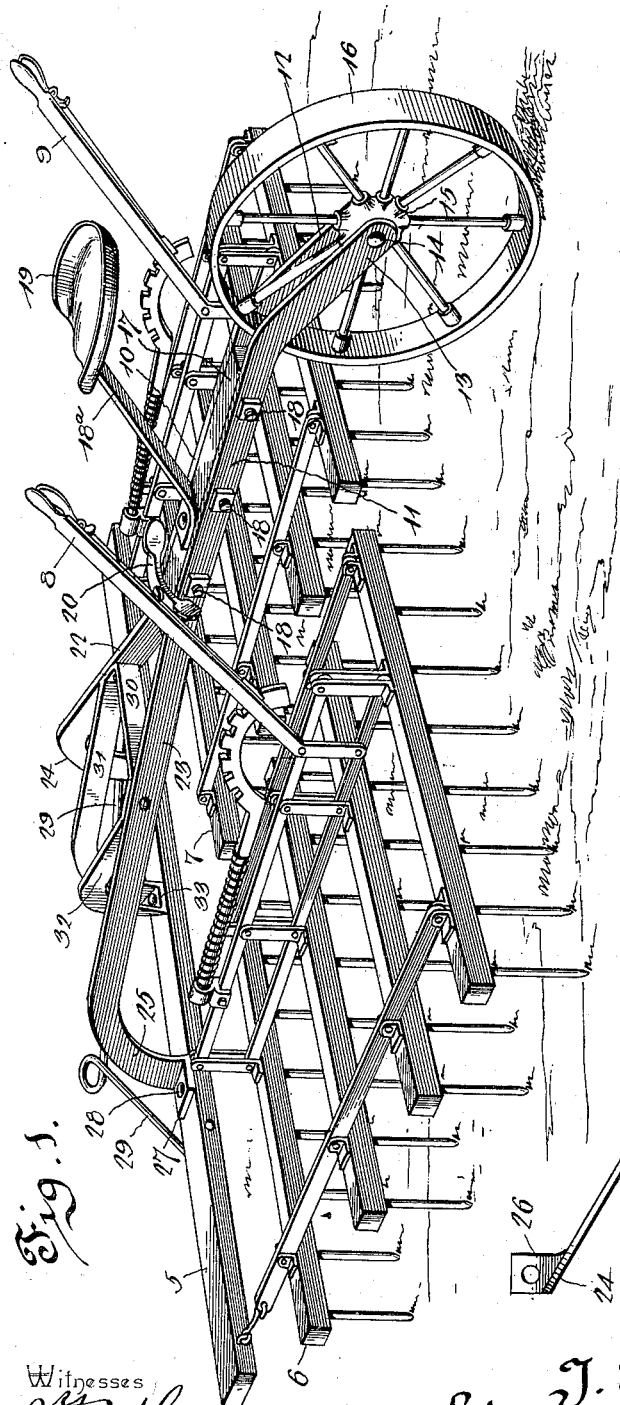
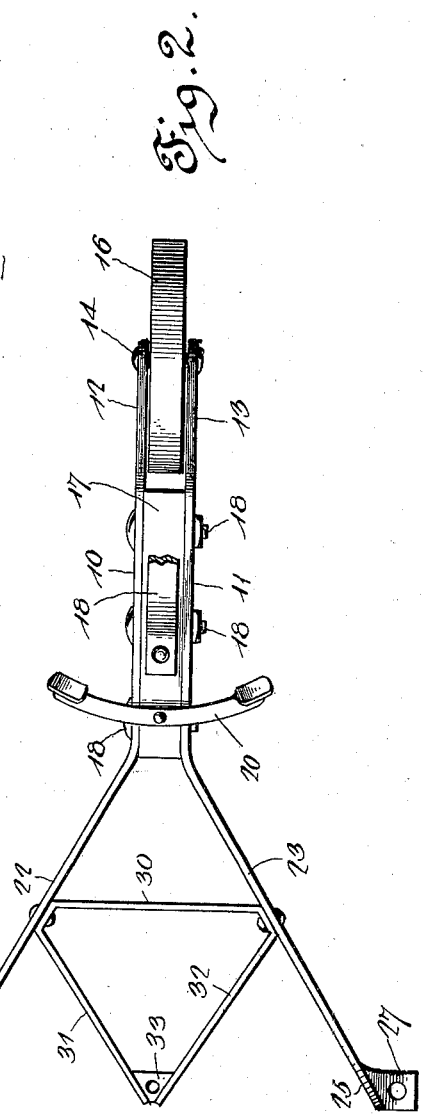
J. P. Duvall, Inventor.

UNITED STATES PATENT OFFICE.

JEPHTHAH P. DUVALL, OF WAVERLY, IOWA.

ATTACHMENT FOR HARROWS.

SPECIFICATION forming part of Letters Patent No. 638,383, dated December 5, 1899.

Application filed June 6, 1899. Serial No. 719,565. (No model.)

*To all whom it may concern:*

Be it known that I, JEPHTHAH P. DUVALL, a citizen of the United States, residing at Waverly, in the county of Bremer and State of Iowa, have invented a new and useful Attachment for Harrows, of which the following is a specification.

This invention relates to harrows, and more particularly to attachments therefor; and it has for its object to provide a device which may be readily attached to and detached from a harrow and will afford a seat for the driver during the harrowing operation.

The invention consists of a pair of bars the rear portions of which are connected parallel and the rear ends of which are bent downwardly and provided with an axle for the reception of a supporting-wheel. Upon the parallel portions of the bars or upon an intervening connection thereof is mounted a seat-support carrying a seat for the driver, said intervening connection also carrying a foot-rest. In advance of the said parallel portions the bars diverge and have their forward extremities bent downwardly and then turned laterally to form feet, through the medium of which they are connected with the drag-bar of a harrow. The seat is so disposed that a large portion of the weight of the driver comes directly upon the supporting-wheel, and the additional weight contributed to the harrow does not detract from its efficiency, nor does it materially retard the progress thereof.

In the drawings forming a part of this specification, and in which like numerals of reference designate corresponding parts in both views, Figure 1 is a perspective view of a harrow having my attachment connected therewith. Fig. 2 is a plan view of the harrow attachment.

Referring now to the drawings, 5 represents the front or drag bar of a harrow, with which are pivotally connected a plurality of harrows 6 and 7 of any desired form, and which harrows form no portion of my invention. These harrows 6 and 7, however, are provided with a common form of adjusting mechanism comprising levers 8 and 9, as shown.

My attachment, which is directly connected with the drag-bar 5, consists of two bars 10 and 11, arranged parallel at their rear portions, the rear extremities thereof being bent downwardly, as shown at 12 and 13, and provided with an axle 14, upon which is rotatably mounted the hub 15 of a supporting-wheel 16.

In advance of the downwardly-turned portions 12 and 13 and intermediate of the bars 10 and 11 is arranged a separating-beam or other body 17, having perforations alining with corresponding perforations in the bars 10 and 11, and through each alining series of said perforations is passed a securing-bolt 18, through the medium of which the bars 10 and 11 are held securely in position.

Upon the intervening body 17 is mounted a seat-supporting spring $18^a$, having its upper end turned rearwardly and provided with a seat 19, said support and seat being of the usual construction, and the location of said support being such as to bring the seat in a position to enable the operator sitting therein to grasp and operate the levers 8 and 9. In advance of the seat-support $18^a$ is a rearwardly-curved foot-rest 20, consisting of a transversely-extending bar having its ends extended vertically for the direct reception of the feet of the operator.

In advance of the parallel portions of the bars 10 and 11 said bars diverge, as shown at 22 and 23, the forward extremities thereof being turned downwardly, as shown at 24 and 25, and then bent laterally at right angles, as shown at 26 and 27, to form feet for the reception of retaining-bolts 28, passed through alining perforations in said feet and in the drag-bar 5. Connected with the drag-bar is any suitable form of draft appliance 29.

Connected with the portions 22 and 23 of the bars 10 and 11 is a cross-brace 30, having formed integral therewith two bars 31 and 32, which lead to the drag-bar of the harrow, with which they are connected by means of bolts 33 or in any other desired manner. The bars 31 and 32 conform to the curvature of the bars 22 and 23, their downwardly-turned ends being in transverse alinement. By the employment of this construction I secure an extremely stiff structure and one which prevents torsional movement of the attachment and consequently straining of the parts thereof. It will thus be seen that I have provided a very simple and cheap construction which may be readily attached to and detached from a harrow and which when in position will enable the operator to ride without materially affecting the operation of the harrow in any way.

It will be readily understood that I may vary the specific construction, that I may apply my attachment to any form of harrow or other implement to which it is applicable, and that I may vary the proportions of the device and in the manufacture of it may employ whatever materials I may deem expedient.

Having thus described the invention, what is claimed is—

1. The combination with a drag-bar, of two rigid bars having their forward portions diverging and curved downwardly, the extremities of said curved portions being turned laterally and attached to the drag-bar, said rigid bars having their rear portions parallel and their rear extremities turned downwardly, a supporting-wheel mounted in the last-named downturned portions, a body held between the bars, and a seat supported upon the body.

2. A harrow attachment comprising two bars having their rear portions parallel and provided with a supporting-wheel, the forward ends of said bars being divergent, a brace connected with the divergent portions of said bars, and supplemental bars extending from said brace and in transverse alinement with the first-named bar.

3. A harrow attachment comprising two members having their rear portions parallel and provided with a supporting-wheel, the forward portions of said bars being divergent and having their extremities turned downwardly, a brace connecting the divergent portions of the bars, and supplemental bars formed integral with and leading from the ends of said brace and lying in transverse alinement with the first-named bar.

In testimony that I claim the foregoing as my own I have hereto affixed my signature in the presence of two witnesses.

JEPHTHAH P. DUVALL.

Witnesses:
W. H. McGREGOR,
A. J. COLLINS.